United States Patent Office 2,796,202
Patented June 18, 1957

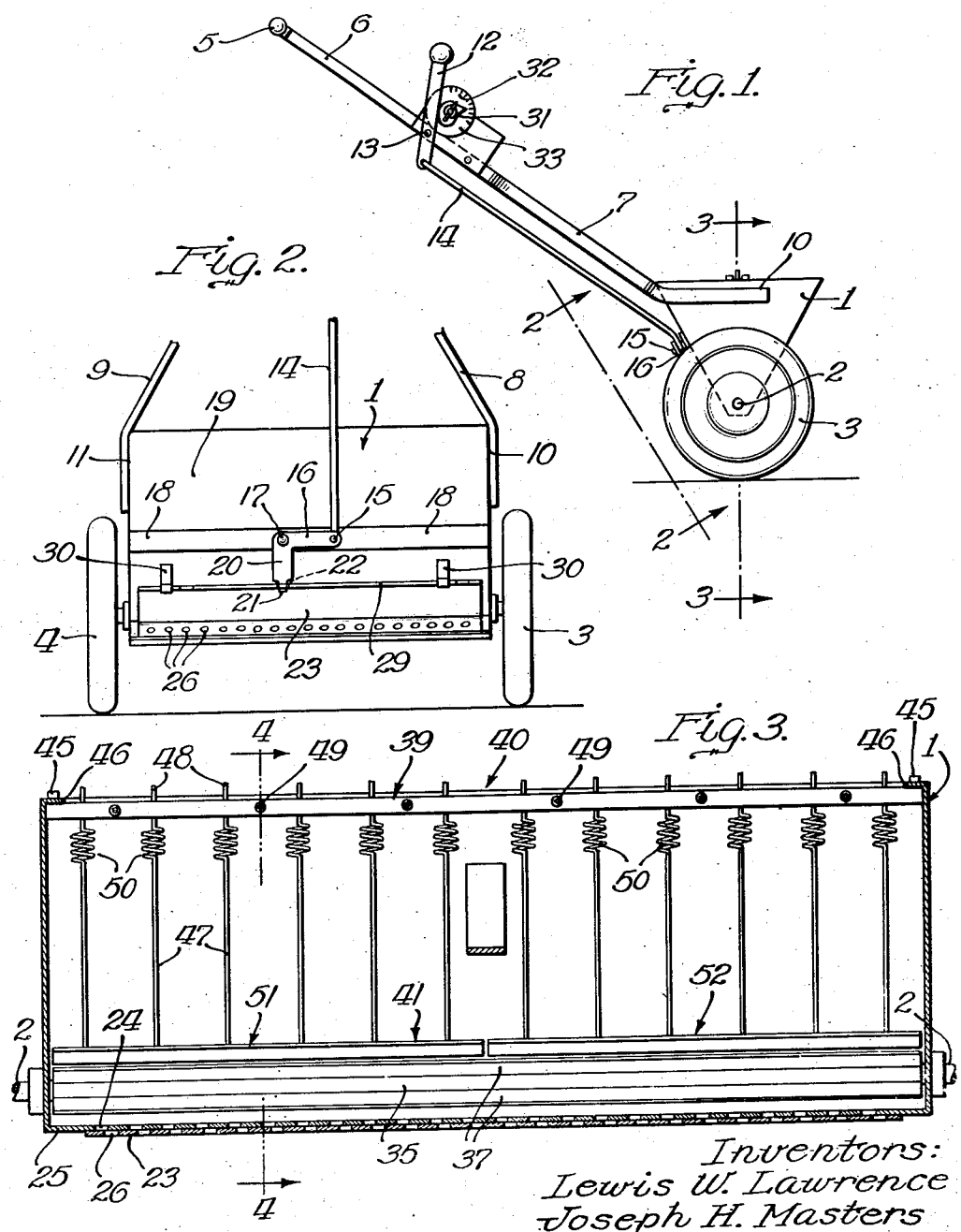

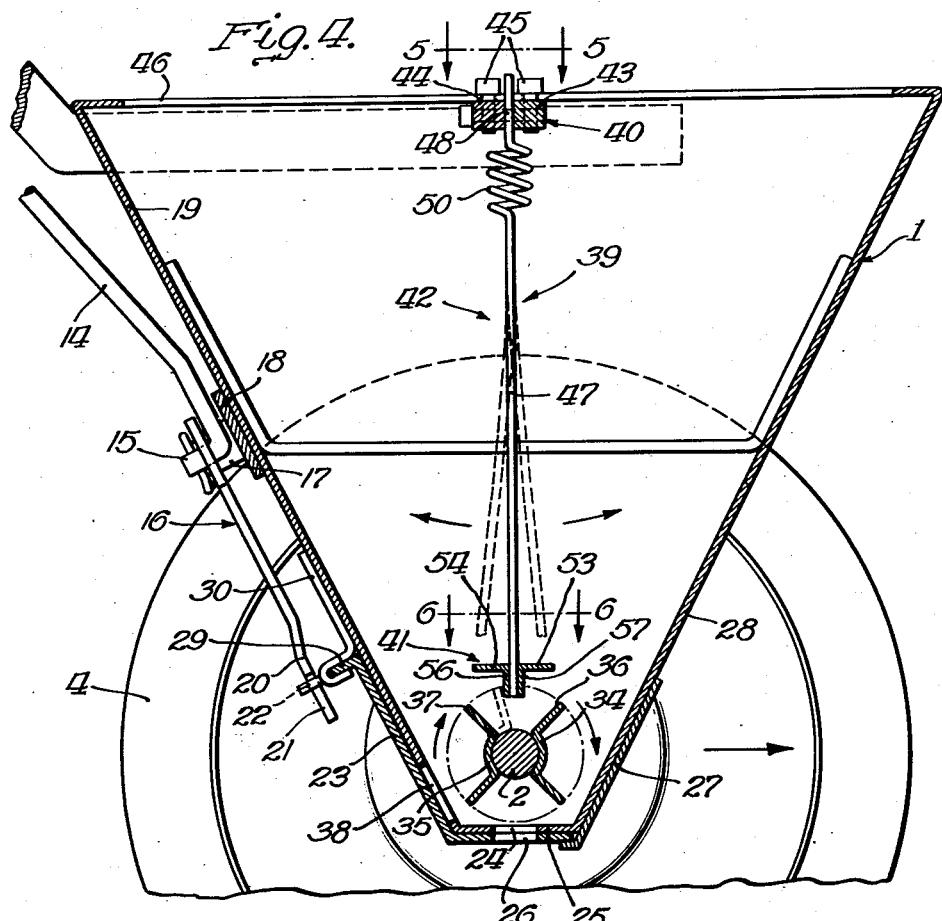
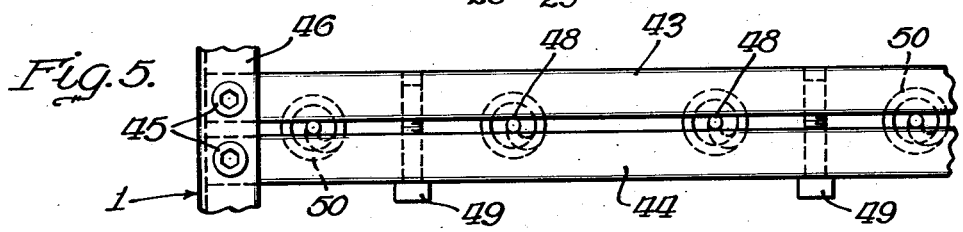
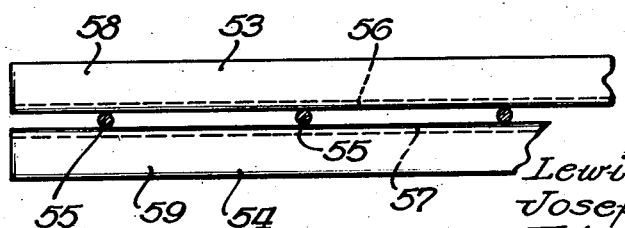
Inventors:
Lewis W. Lawrence
Joseph H. Masters
Edwin L. Masters June 18, 1957 L. W. LAWRENCE ET AL 2,796,202
VIBRATORY MECHANISM FOR MATERIAL DISTRIBUTORS
Filed April 20, 1955 4 Sheets-Sheet 3
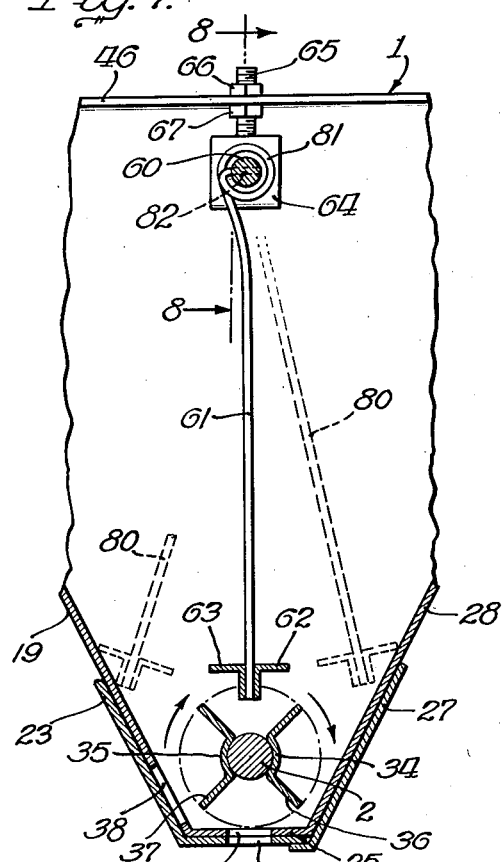
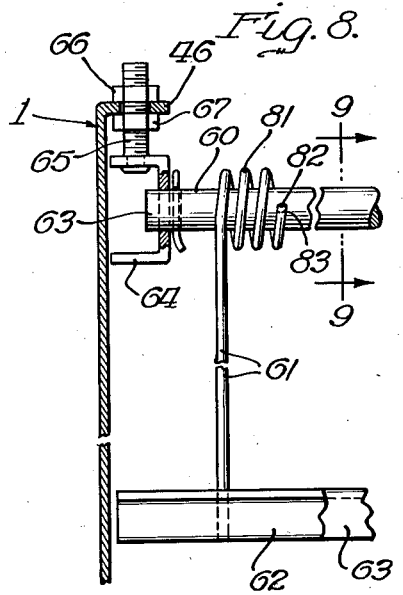
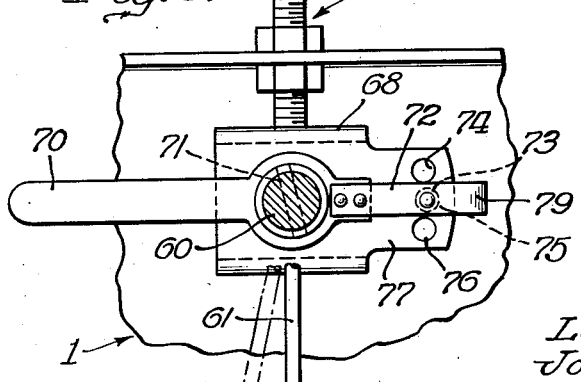
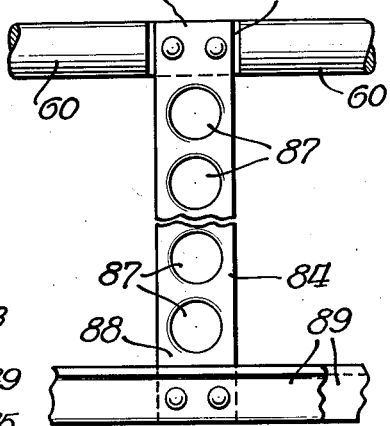
Inventors:
Lewis W. Lawrence
Joseph H. Masters
Edwin L. Masters
By: Eberhard E. Wettley
Atty.

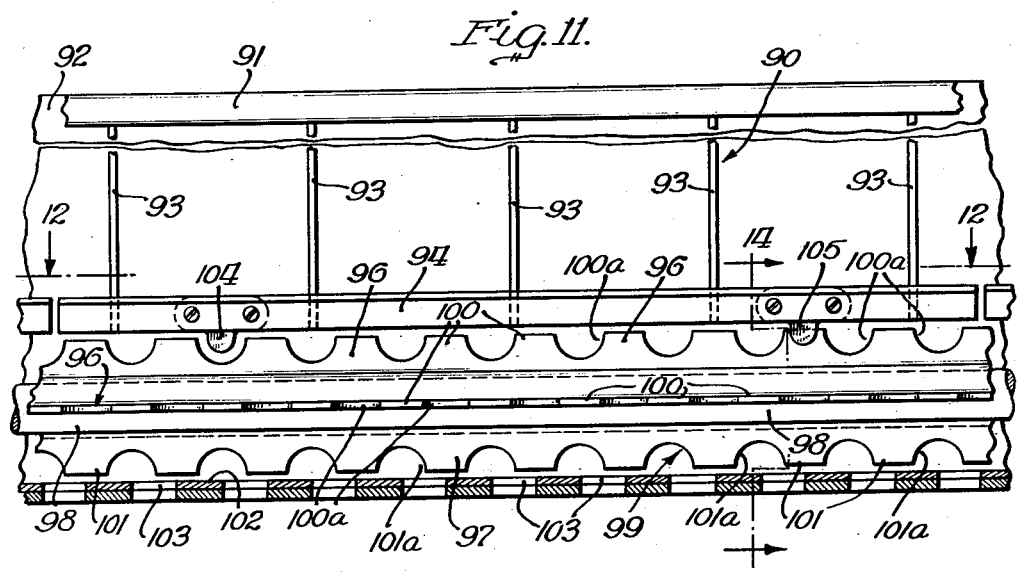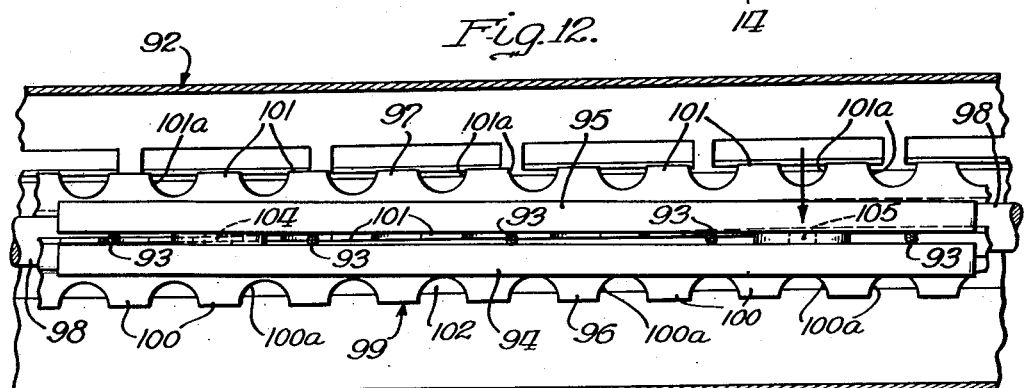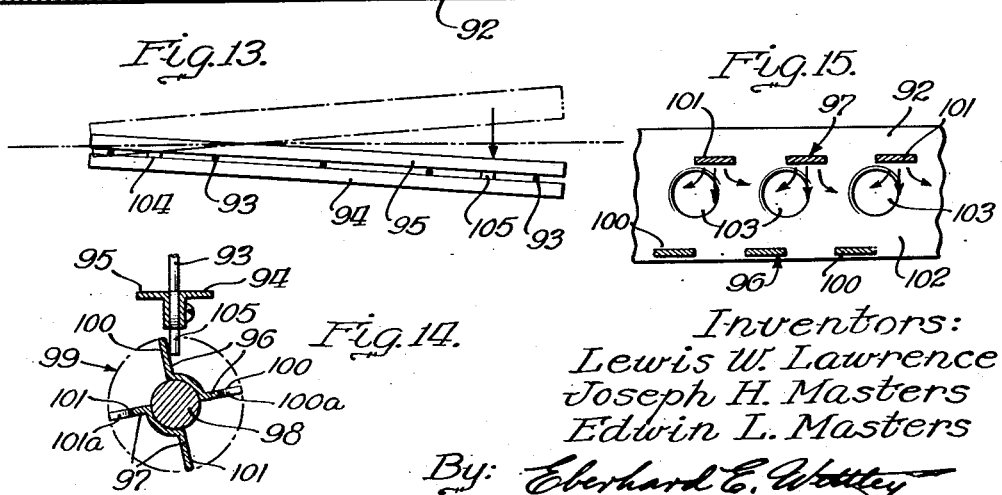

2,796,202

VIBRATORY MECHANISM FOR MATERIAL DISTRIBUTORS

Lewis W. Lawrence, Joseph H. Masters, and Edwin L. Masters, Benton Harbor, Mich., assignors to Masters Planter Company, a corporation of Illinois Application April 20, 1955, Serial No. 502,677

18 Claims. (Cl. 222—233)

This invention comprises an improvement in a material spreader normally adapted for use over generally level ground, grass or fields and for the general distribution of fertilizer or seeds and other analogous materials.

More specifically, the present invention is directed to a vibratory agitator mechanism provided for the purpose of maintaining a steady feed of materials from within the material carrying container through the feed openings of the container for discharge to the surface over which the device is being operated.

It is one of the principal objects of the present invention to provide a vibratory means that is supported within the material carrying hopper or container and which is adapted to be periodically actuated to set up a continuously vibrating means which will prevent stoppage of material from within the hopper or container through the discharge openings thereof whereby a continuous feed of the material being distributed is insured.

It is another principal object of the present invention to provide a vibratory mechanism within a hopper or container which operates in conjunction with a material agitator also confined within such hopper or container and wherein the agitator provides the actuating means for the vibratory mechanism.

Another object of the present invention is to provide a vibratory mechanism that is generally composed of a number of elements all located in a common plane and disposed in a given plane within the hopper and also in a given relation to a rotary agitator and so constructed and arranged to be most effective adjacent such rotary agitator to thereby maintain a continuous flow of the hopper material to the hopper discharge openings with such material being agitated and directed to the openings by the rotary agitator.

Another object of the present invention is directed to the particular construction of a plurality of spring fingers of a compound variety that are supported in an overhead relation and preferably adjacent the top edge portion of a hopper and which depend downwardly into the hopper and through the general central material carrying area thereof, these spring fingers being collectively connected by means that receive periodic impulses directly from a movable agitator which is mounted adjacent the lower portion of said hopper and over the discharge openings thereof. With this arrangement the greater amplitude of the vibrations are confined to the area immediately adjacent the movable agitator and in the narrower portion of the hopper to very effectively maintain the hopper material in motion and to prevent bridging of the material either through caking or through intertwining of the various material aggregate pieces which might provide a bridging of the agitator area.

It is another object of the present invention to provide a vibratory agitating mechanism which is provided with a material moving unit having certain portions thereof operating broadwise in the direction of the normal vibration of the vibrator while certain other portions thereof are arranged to provide a cutting unit or element which also operates in the general direction of the vibratory action. With this particular combination it is possible to keep the hopper material in motion both through a positive displacement and through a cutting action which takes place simultaneously under the mechanical vibratory means that supports the units described.

As a further object the present invention also introduces the use of a flexible vibratory means wherein the upper edge thereof is carried adjacent the material receiving portion of the hopper with the lower edge thereof adjacent the agitator and wherein cooperative means are provided on the vibratory mechanism and on the moving agitator of the material distributor which will cause the vibratory unit to describe a compound action wherein one portion of the vibratory unit adjacent the agitator operates in a greater amplitude through a predetermined path than another portion of the same vibratory unit. Added to this the object includes the alternate actuation of the same unit whereas the greater amplitude variation is successfully applied to the same vibratory unit so as to first provide the greatest amplitude variation at one end of the vibrator adjacent the agitator and then to apply the same form of vibratory action at the other end of the same unit.

Another object of the present invention is to provide an agitator having scalloped edges leaving spaced straight faces radially outwardly with respect to the axis of the agitator and whereas these spaced faces are staggered between the adjacent paddle wheel formations of the agitator and in the longitudinal direction of the axis so that every other rotating portion of the agitator will pass over the discharge feed openings in varying paths to maintain the material in the bottom of the hopper in motion for optimum discharge through the openings. This same staggered face arrangement of the agitator paddles also provide the direct cooperative actuating means which cooperates with the flexible vibratory means to obtain the direct vibratory action from the agitator and alternately along spaced points of the vibratory unit to obtain the wobbulator action of the vibratory member adjacent the rotary agitator.

Another object of the present invention is to provide means for the vertical adjustment and positioning of the vibratory means in respect to the movable agitator of a material spreader together with similar object directed to the introduction of a means for bodily shifting the vibrator agitator transversely with respect to the axis of movement of the rotary feed member so as to provide a means for storing the vibratory mechanism in the event that materials are being fed which need no such vibratory action.

Other objects and advantages relating to the material spreader of the present invention shall hereinafter appear in the following detail description of a preferred construction and modifications of a spreader as disclosed in the accompanying drawings forming a part of the specification.

In the drawings:

Figure 1 is a side elevational view of a material spreader incorporating the improvements of the present invention;

Figure 2 is a rear view of the material spreader illustrated in Figure 1 and as viewed substantially in the plane of the line 2—2 shown in Figure 1;

Figure 3 is a longitudinal vertical cross sectional view taken through the hopper or material container as substantially indicated by the line 3—3 in Figure 1 and looking in the direction of the arrows;

Figure 4 is a transverse vertical cross sectional view taken substantially along the line 4—4 in Figure 3 to illustrate further details of construction of the units of the present invention;

Figure 5 is a fragmentary top plan view of a portion of the overhead support substantially as viewed along the line 5—5 in Figure 4;

Figure 6 is another horizontal cross sectional view of a fragmentary portion of the vibratory unit as seen substantially along the line 6—6 in Figure 4;

Figure 7 is a transverse vertical cross sectional view substantially on the order of Figure 4 but illustrating a modified construction of vibratory unit directed to the same general inventive concept as the form illustrated in Figure 4;

Figure 8 is a fragmentary detail cross sectional view along the line 8—8 in Figure 7 to show further details of construction of the modified construction of the invention;

Figure 9 is a fragmentary detail cross sectional view taken substantially along the line 9—9 of Figure 8 to illustrate the opposite end portions of the vibratory unit as the same would appear adjacent the opposite wall of the hopper showing further details of construction of this modified arrangement;

Figure 10 is a fragmentary detail view of a modified spring means adapted to the vibratory agitator mechanism;

Figure 11 is a transverse cross sectional view of a fragmentary portion of a hopper and material spreader illustrating another modified arrangement of the present invention;

Figure 12 is a horizontal cross sectional view taken substantially along the line 12—12 in Figure 11 to illustrate further details of this latter modified construction;

Figure 13 is a diagrammatic plan view of the vibratory portion of the modified construction of the device illustrated in Figures 11 and 12 to illustrate generally the wobbulator action of the unit of this construction;

Figure 14 is a vertical transverse cross sectional view as taken substantially along the line 14—14 in Figure 11; and Figure 15 is a small diagrammatic plan view of the inside of the bottom of the hopper and showing the openings therein and the relationship of the various external edge portions of a rotating agitator such as shown in Figures 11 and 12 of the latter modified arrangement of material spreader.

A preferred arrangement of the vibratory agitating mechanism of the present invention is best illustrated in Figures 1 to 6 inclusive. As seen in Figure 1, the material spreader comprises a material carrying container or hopper 1 supported upon a suitable axle 2 carried in a pair of wheels such as 3 and 4 which provide the mobile structure of this arrangement which is actuated along a supporting surface by means of a hand grip 5 carried upon a handle 6 which is divided into a Y arrangement 7 having laterally outwardly disposed brackets 8 and 9 which are attached to the sides of the hopper 1 at 10 and 11. Also mounted upon the handle 6 is a control lever 12 pivoted at 13 and having a connecting rod 14 that is pivotally connected at 15 to a bell crank 16. The bell crank 16 is pivoted at 17 to a brace 18 that is secured to the rear wall 19 of the hopper. A depending leg 20 of the bell crank 16 terminates with an ear 21 that operates within a slot 22 carried in an adjustable valve plate 23 which controls the amount of the feed of the material through the openings 24 in the bottom 25 of the hopper 1 by means of the coincident matching openings 26 carried in the valve plate 23.

The valve plate 23 is longitudinally shiftable with respect to the bottom of the hopper and is slidably secured in operative relation to the hopper by means of a forward baffle 27 secured to the front wall 28 of the hopper with the rearward upward edge of the valve plate 23 being provided with a flange 29 which is held against the rear wall 19 of the hopper by means of clips 30.

The amount of longitudinal regulation of the valving feed plate 23 is controlled by an adjustable cam 31 that can be set according to the graduations 32 carried upon a plate 33 so that operating the control lever 12 downwardly against the cam 31 a predetermined position of the plate 23 is obtained through the control rod 14 and bell crank 16.

As best illustrated in Figures 3 and 4, the agitator shaft 2 is provided with agitating members 34 and 35 each of which carries radial blades 36—36 and 37—37 that provide a paddle wheel formation of rotary agitator which operates in the vicinity immediately adjacent and above the discharge openings 24 and 26 formed in the bottom of the hopper 25 and in the valving plate 23. Under certain conditions of operation the plate 23 may be removed entirely to completely uncover or open the openings 24 and to also uncover a plurality of side openings 38 which are formed to the rear and immediately adjacent the bottom of the hopper 1.

Again referring to Figures 3 and 4, the vibratory mechanism is generally illustrated at 39 including an overhead supporting unit 40 and a vibratory agitating unit 41 connected by intermediate spring means such as 42 with the support unit being carried in a position adjacent the upper portion of the hopper and remote from the rotary agitator at the bottom of the hopper and with the vibrating agitator unit 41 disposed adjacent the rotary agitator at the bottom of the hopper.

The supporting unit comprises a pair of bars 43 and 44 secured at opposite ends by means of screws 45 to the inturned flanges or ledges 46 comprising a part of the upper edge of the hopper 1. A plurality of vertically disposed spring legs 47 have their upper ends 48 sandwiched between the bars 43 and 44 and held in this position by means of screws 49 established along the length of the supporting unit 40. Each of the spring legs 47 is provided with a coil spring section 50 adjacent the support unit 40, which provides additional flexibility to the entire vibratory mechanism and which also counteracts too much flexing of the spring legs 47 adjacent their carrying supporting bars 43 and 44, thus greatly promoting the length of life of these particular spring units.

The lower vibratory units 41 may be divided into a number of sections lengthwise of the hopper 1 substantially as shown at 51 and 52 in Figure 3, but each of these units are constructed with a pair of angle irons such as 53 and 54 best illustrated in Figures 4 and 6. The lower ends 55 of the spring wires or legs 47 are welded or otherwise secured to the angles 53 and 54 and it should also be noted as best shown in Figure 4 that the angles are positioned back to back with their vertical legs 56 and 57 providing a broad side arrangement for moving the material over and across the rotating agitator in the bottom of the hopper while such angles also have their other legs 58 and 59 arranged in coplanar relationship and oppositely outwardly with respect to the spring legs or fingers 47 to produce a cutting action operable directly in the material above the rotary agitator of the material spreader.

By breaking up the vibratory mechanism into several vibratory units such as 51 and 52 in the lower portion of the hopper greater actual activity is obtained in the areas in which each of the vibratory mechanisms operates. The suspension of the vibratory mechanism from the overhead support unit 40 is carried out as one complete structure to provide an easy assembly arrangement which can be provided as standard equipment in a material spreader or which can be easily added to such a spreader if the proper holes or openings have been provided for screws such as 45 to secure the unit 40 to the hopper flange 46.

It should be noted, as best illustrated in Figure 4, that the lower vibratory unit 41, which is suspended in pendulum fashion from the upper supporting unit 40, that the angle members 53 and 54 depend downwardly in a radial position within the path of operation of the radially outward parts of the rotating agitator which in this case are the blades 36—36 and 37—37. In this fashion revolutions in the rotating agitator in the bottom of the hopper as brought about by the movement of the wheels over the ground is transmitted periodically to the vibratory mechanism by the blades striking the lower unit 41 of the vibratory means. Between each blade contact there is considerable vibratory motion back and forth in steadily diminishing amplitudes which depends upon the consistency of the material being fed through the hopper. Furthermore, both of the angle units 53 and 54 provide weighted means which help to maintain the amplitude vibration of the spring wires or fingers 47, but it is obvious that a constant vibration of this vibratory agitator takes place during the operation of the spreader and as the rotating agitator is driven. Therefore, between the combination action obtained through the radially vibrating unit of the present invention and the actuating agitator a very efficient means is introduced into a material spreader of this construction which will substantially prevent any caking or bridging or stoppage of the particular feed of material that is being used in a hopper of this character.

Referring more particularly to Figures 7 and 8, which are directed to a modified construction of the vibratory mechanism, it may be desirable under certain conditions of operation to obtain a vertically adjustable vibratory unit so that the position thereof may be changed with respect to the location of the rotary vibrator in the hopper. Such an arrangement is best illustrated in Figures 7 and 8 wherein the overhead support includes a cross rod 60 which carries a plurality of spring fingers 61 connected with the lower angles 62 and 63 and wherein each of the end portions of the supporting rod are carried in a bearing bracket 64. This bracket is suspended from the flange 46 of the hopper 1 by means of a vertically positioned adjusting screw 65 which is regulated by nuts 66 and 67 that are oppositely arranged with respect to flange 46. Thus we have an arrangement where vertical adjustment of the entire vibratory mechanism is possible.

It should also be noted that the opposite end of the rod 60 includes another bracket 68 similar to the bracket 64 and the adjusting screw mechanism such as 69. But in addition, the rod 60 is provided with a lateral handle 70 which is secured thereto by means of a pin such as 71 and which carries a spring clip 72 having a detent pin 73 which may be positioned into any one of the openings 74, 75 and 76 that are formed in an extension 77 on the bracket 68. With this arrangement, it is possible to lift the end 79 of the spring clip to swing the group of wires 61 from an operative central position as determined by the full line position in Figure 9 to one or the other of the dotted line positions 80 wherein the vibratory mechanism can be stored against one or the other side of the hopper whenever the material being spread will flow without the additional vibratory means. This provides a mechanism whereby this vibratory structure may be readily stored at any time that it is desirable to operate the rotating agitator per se.

In addition, it should be noted that each of the spring wires or legs 61 of the present modification terminate in a coil spring 81 that is wound about an axis which is coincident with the supporting rod 60 and wherein the ends 82 of each of the wire units is secured in an opening 83 formed through the rod 60. With the coil spring 81 axis coincident with the axis of the support rod 60, the natural flexing of the coil is utilized to permit free vibratory action of the spring leg 61 without any undue strain at the support to thereby provide a long lasting and efficient vibratory unit.

In Figure 10, the use of a modified spring finger or leg 84 is illustrated, which consists of a flat leaf spring that may be secured or supported from between the bars 43 and 44 (Figure 5) as are springs 47 if so desired, or the rod 60 of Figures 7, 8 and 9 may be provided with flattened recesses 85 to accommodate the upper ends 86 of such spring legs as 84. As a means for lightening the spring legs 84 and to provide further material disturbing and agitating facilities, each spring strip is made with a plurality of openings 87. The leaf springs 84 are joined at their bottom ends 88 by angles 89 similar to those incorporated into the previously described vibratory mechanisms. And if desired, the leaf spring may include a coiled portion at its upper end to encircle the rod or shaft 60 in substantially the same way as the spring legs 61 are arranged and connected with the overhead support rod or shaft 60 as shown in Figures 7 and 8.

A further modification of the material spreader of the present invention appears in Figures 11 to 15 inclusive. This construction provides a somewhat different vibratory unit and rotary agitator combination whereby the vibrating part or section of the vibratory unit is disposed in proximity to the rotary agitator and describes a wobbulator action. The action of the freely suspended vibratory portion of the unit and the rotary agitator are constructed and arranged to impart a compound motion to the vibratory portion of the spring agitator which may be described as a shiftable amplitude variation coupled with a bodily displacement.

This modified arrangement uses one or more vibratory units such as 90 suspended from an overhead support 91 carried in fixed relation to the hopper 92, said units each using depending spring legs or fingers 93 connected at their free ends with angles 94 and 95 which are carried in vertically spaced relation above and out of the paths of the blade or paddle leg members 96—96 and 97—97 carried upon the shaft 98 of the rotary agitator 99.

The agitator 99 in this instance provides scalloped edges along each of the blades 96—96 and 97—97 to provide longitudinally spaced peripherally situated flats or teeth 100 and 101 respectively. In addition, the scallops of each of the radial blades of the sets 96—96 and 97—97 are offset longitudinally in the axial direction of the shaft 98 so that rotation of the agitator causes successive blade movements in alternate longitudinally spaced paths over a given point of the hopper bottom 102 and in a given relation with respect to the spaced openings 103 in the bottom 102 of hopper 92. This relationship is illustrated in Figure 14 wherein blades 96, as in the sectional plane indicated in Figure 11, show flats or teeth 100 and scallops 100a, while blades 97 present scallops 101a and flats or teeth 101, all teeth operating in common planes disposed transversely with respect to the axis of shaft 98. In Figure 15, the successive flats or teeth of the blades 96—96 and 97—97 are diagrammatically shown in their paths of operation as viewed in respect to the material feed openings 103 in the bottom 102 of the hopper 92. With the staggered blade teeth arrangement, material is moved generally in the direction of rotation of the blade groups and also in opposite longitudinally directed paths as shown by the arrows in Figure 15 to actually create longitudinal back and forth movement of the material between successive adjacent teeth to efficiently move the material to and out off the openings 103 in the hopper obviously coupled with the general rotary agitated motion of the agitator blades and their respective teeth.

By taking full advantage of the longitudinally staggered arrangement of the teeth or flats, the angles 94 and 95 are arranged to terminate in spaced locations out of the peripheral paths of the agitator teeth, and suitable abutment fingers 104 and 105 are secured to the angles 94 and 95. Fingers 104 and 105 depend downwardly as best illustrated in Figures 11 and 14 to be situated in the paths of the teeth 100 and 101 of the blades 96 and 97, However, the abutment fingers 104 and 105 are also so spaced longitudinally of the angles 94 and 95 as to ride in an agitator scallop at one end and in the path of an agitator tooth at the other end as seen in Figure 11. Thus the angles and free spring ends of the vibratory unit 90 become biased as diagrammatically shown in Figure 13 before the contacting tooth leaves the engaged abutment ear 105. Disengagement of the parts noted will then produce the compound wobbulator action of the bottom end of the vibratory unit 90. As this action becomes dampened in the hopper material the action is again picked up but in an opposite and reversed order as the next agitator blade will now bring a staggered tooth against the other abutment ear 104 previously missed to bias the other longitudinal end portion of the vibratory unit to warp the latter, the previously actuated ear now being avoided through a scalloped portion of the same agitator blade.

Considerable variation in the resultant compound vibrator action may be obtained by varying the positions of the abutment ears 104 and 105 along the length of angles 94 and 95 and/or through the use of a different number of agitator blades and tooth division therebetween.

The material spreader of the present design and construction provides a positive feeding and distributing range to handle all kinds and forms of materials that may be graded from the finest powdery slaked lime having packing and bridging tendencies and on up to coarse granular steer manure or other like hard to feed materials whether fertilizers, treatment materials or seeds, etc.

The foregoing description and disclosure are directed to a preferred construction and to certain modified constructions of the invention. Certain changes and deviations in the combinations or in the individual elements thereof are contemplated without departing from the fundamental concept of the present invention. The extent of the modifications shall, however, be governed by the breadth and scope of the appended claims directed to the invention.

What we claim is:

1. In a material spreader, the combination comprising a material carrying container having material discharge openings, a material agitator adapted for rotary operation adjacent said container discharge openings, said rotary agitator having circumferentially spaced material moving members thereon, and a supplemental material agitating mechanism having one edge portion thereof rigidly secured to said container and supported remote from said rotary agitator and in a fixed given relation with respect to said container, said agitating mechanism providing a freely suspended edge portion terminating radially inwardly with respect to the circumferential path traversed by said rotary agitator members, said members upon rotation subjecting said free edge portion of said supplemental agitating mechanism to repeated bodily displacement in a path angularly disposed with respect to the axis of rotation of said rotary agitator and relatively to said one fixed edge portion thereof.

2. In a material spreader, the combination comprising a material carrying container having material discharge openings, a material agitator adapted for rotary operation adjacent said container discharge openings, said rotary agitator having circumferentially spaced material moving members thereon, and a supplemental material agitating mechanism having one edge portion thereof rigidly supported remote from said rotary agitator and in a given relation with respect to said container and providing a freely suspended edge portion terminating radially inwardly with respect to the circumferential path traversed by said rotary agitator members, said members upon rotation subjecting said free edge portion of said supplemental agitating mechanism to be repeated bodily displacement in a path angularly disposed with respect to the axis of rotation of said rotary agitator, said supplemental material agitating mechanism comprising a bridging unit mounted on top of the hopper, spring wire elements securely connected with said bridging unit and depending downwardly into said hopper and through said hopper material, and a material displacement unit connected with the depending free ends of said wire elements and arranged in proximity to said rotary agitator for deflecting contact by said agitator members upon operation of the agitator.

3. In a material spreader, the combination comprising a material carrying container having material discharge openings, a material agitator adapted for rotary operation adjacent said container discharge openings, said rotary agitator having circumferentially spaced material moving members thereon, and a supplemental material agitating mechanism having one edge portion thereof rigidly supported remote from said rotary agitator and in a given relation with respect to said container and providing a freely suspended edge portion terminating radially inwardly with respect to the circumferential path traversed by said rotary agitator members, said members upon rotation subjecting said free edge portion of said supplemental agitating mechanism to repeated bodily displacement in a path angularly disposed with respect to the axis of rotation of said rotary agitator, said supplemental material agitating mechanism comprising a bridging unit mounted on top of the hopper, spring wire elements securely connected with said bridging unit and depending downwardly into said hopper and through said hopper material, and a material displacement unit connected with the depending free ends of said wire elements and arranged in proximity to said rotary agitator for deflecting contact by said agitator members upon operation of the agitator, and said material displacement unit comprising at least one relatively heavy structural part as considered in relation to the weights of the spring wire elements to impart additional flexing impetus to said spring wire elements.

4. In a material spreader, the combination comprising a material carrying container having material discharge openings, a material agitator adapted for rotary operation adjacent said container discharge openings, said rotary agitator having circumferentially spaced material moving members thereon, and a supplemental material agitating mechanism having one edge portion thereof rigidly supported remote from said rotary agitator and in a given relation with respect to said container and providing a freely suspended edge portion termiating radially inwardly with respect to the circumferential path traversed by said rotary agitator members, said members upon rotation subjecting said free edge portion of said supplemental agitating mechanism to repeated bodily displacement in a path angularly disposed with respect to the axis of rotation of said rotary agitator, said supplemental material agitating mechanism comprising a bridging unit mounted on top of the hopper, spring wire elements securely connected with said bridging unit and depending downwardly into said hopper and through said hopper material, and a material displacement unit connected with the depending free ends of said wire elements and arranged in proximity to said rotary agitator for deflecting contact by said agitator members upon operation of the agitator, and said material displacement unit comprising a pair of angles arranged with one leg of each back to back on opposite sides of the spring wire elements and with the other legs of said angles disposed to extend oppositely outwardly with respect to the spring wire elements.

5. In a material spreader, a material carrying hopper having discharge apertures, a rotatable agitator in said hopper arranged adjacent said apertures and adapted for moving hopper material out of the apertures, a support mounted upon said hopper, and vibratory mechanism in said hopper to keep the hopper material in motion in proximity to said rotary agitator comprising a plurality of pendulum spring members connected with said support and arranged to depend into the hopper through the entire depth of the hopper and of the hopper material carrying zone of said hopper and directed toward said rotatable agitator, and weight members connecting the free ends of said pendulum spring members, certain of the aforesaid members being positioned for periodic engagement by portions of said rotatable agitator when the latter is in operation to impart continuous oscillatory vibratory actuation to said weight members through the instrumentality of said pendulum spring members.

6. In a material spreader, a material carrying hopper having discharge apertures, a rotatable agitator in said hopper arranged adjacent said apertures and adapted for moving hopper material out of the apertures, a support mounted upon said hopper, and vibratory mechanism in said hopper to keep the hopper material in motion in proximity to said rotary agitator comprising a plurality of pendulum spring members connected with said support and arranged to depend into the hopper through the hopper material and directed toward said rotatable agitator, and weight members connecting the free ends of said pendulum spring members, certain of the aforesaid members being positioned for periodic engagement by portions of said rotatable agitator when the latter is in operation to impart continuous oscillatory actuation to said weight members through the instrumentality of said pendulum spring members, and adjustable means interposed between said support and said hopper to selectively vary the coactive spacing between said vibratory mechanism and said rotatable agitator.

7. In a material spreader, a material carrying hopper having discharge apertures, a rotatable agitator in said hopper arranged adjacent said apertures and adapted for moving hopper material out of the apertures, a support mounted upon the upper end of said hopper, and vibratory mechanism in said hopper to keep the hopper material in motion in proximity to said rotary agitator comprising a plurality of pendulum spring members connected with said support and arranged to depend into the hopper through the entire vertical depth of the hopper material carrying zone in said hopper space and being directed toward said rotatable agitator, and material agitating weight members connecting the free ends of the pendulum spring members, certain of the aforesaid members being positioned for periodic engagement by portions of said rotatable agitator when the latter is in operation to impart continuous oscillatory vibratory actuation to said weight members through the instrumentality of said pendulum spring members.

8. In a material spreader, a material carrying hopper having discharge apertures, a rotatable agitator in said hopper arranged adjacent said apertures and adapted for moving hopper material out of the apertures, a support mounted upon said hopper, and vibratory mechanism in said hopper to keep the hopper material in motion in proximity to said rotary agitator comprising a plurality of pendulum spring members connected with said support and arranged to depend into the hopper through the hopper material and directed toward said rotatable agitator, and material agitating members connecting the free ends of the pendulum spring members, certain of the aforesaid members being positioned for periodic engagement by portions of said rotatable agitator when the latter is in operation to impart continuous oscillatory actuation to said weight members through the instrumentality of said pendulum spring members, said agitating members comprising angle units having certain legs thereof arranged to cut into the hopper material under vibration and having certain other legs thereof arranged to engage the hopper material broadside under vibration to bodily displace the hopper material.

9. In a material spreader, a hopper with material discharge openings, a movable agitator in said hopper arranged to discharge the material through said hopper openings, and a resilient vibratory unit disposed in said hopper in alignment with said agitator and having at least one portion thereof positioned for actuating contact by said movable agitator, and adjustable mechanisms carried by said hopper and connected to support said vibratory unit in a given spaced relation with respect to said movable agitator and arranged for selectively changing the spaced relation between said unit and said agitator.

10. In a material spreader, a hopper with material discharge openings, a movable agitator in said hopper arranged to discharge the material through said hopper openings, and a resilient vibratory unit disposed in said hopper in alignment with said agitator and having at least one portion thereof positioned for actuating contact by said movable agitator, and adjustable mechanisms carried by said hopper and connected to support said vibratory unit in a given spaced relation with respect to said movable agitator and arranged for selectively changing the spaced relation between said unit and said agitator, one of said adjustable mechanisms including swingable means connected with said vibratory unit to bodily swing said unit out of alignment with respect to said agitator and from operative position to an inoperative stored position or vice versa.

11. In a material spreader, a hopper with material discharge openings, a movable agitator in said hopper arranged to discharge the material through said hopper openings, a vibratory unit in said hopper having portions thereof disposed for direct contact by parts of said movable agitator, bearing means mounted upon said hopper, said unit having pivotal conenctions with said bearing means, and a swingably adjustable detent mechanism arranged to support said unit in a given fixed relation with respect to said bearing means and to bodily displace said unit relatively to said bearing means to selectively dispose said unit in different fixed positions with respect to said bearing means and out of operative contact with respect to said agitator.

12. In a material spreader, a hopper with material discharge openings therein, a movable agitator in said hopper, and a vibratory unit carried by said hopper with portions thereof terminating adjacent said agitator for direct engagement by portions of the agitator, said vibratory unit comprising an elongated support rigidly secured to said hopper and extending thereacross in an area located generally above the material carrying area of said hopper, said elongated support being provided with a plurality of longitudinally spaced deflectable spring wire legs depending into the hopper and directed toward said agitator, and said spring wire legs each including a coil wire section in the length thereof arranged adjacent said support.

13. In a material spreader, a hopper with material discharge openings therein, a movable agitator in said hopper, and a vibratory unit carried by said hopper with portions thereof terminating adjacent said agitator for direct engagement by portions of the agitator, said vibratory unit comprising an elongated support rigidly secured to said hopper and having a plurality of deflectable spring wire legs depending into the hopper directed toward said agitator, and said spring wire legs each including a coil wire section in the length thereof and arranged adjacent said support, said coil wire section being positioned with the axis thereof disposed in the same direction as the axis of said elongated support.

14. In a material spreader, a material hopper with discharge openings, a movable agitator in said hopper having scalloped portions thereon, said scalloped portions being laterally staggered along said agitator and adapted for movement in paths that are offset with respect to said hopper discharge openings, and a vibratory unit carried by said hopper and arranged with one end portion thereof disposed adjacent said agitator, said unit having depending portions thereon arranged for periodic contact by certain of said staggered portions of said scalloped agitator.

15. In a material spreader, a material hopper with discharge openings, a movable agitator in said hopper having scalloped portions thereon, and a vibratory unit carried by said hopper and arranged with one end portion thereof disposed adjacent said agitator, said unit having depending portions thereon arranged for contact by certain portions of said scalloped agitator, said depending portions of said unit occupying spaced positions along said vibratory unit, and said agitator scalloped portions being alternately offset in relation to said depending portions whereby said depending portions are alternately actuated by said offset portions of said scalloped agitator.

16. A vibratory mechanism for material spreaders including an apertured hopper and a movable agitator therein comprising a support attached at the open top of said hopper, a pendulum unit connected with said support and adapted for disposition within said hopper and in a position for engagement by portions of said agitator, said unit comprising a plurality of straight wire legs to penetrate the entire vertical depth of the material carrying area of said hopper to agitate all of the material, said wire legs having material displacement members connecting the free ends theerof, and said wire legs each including a coil wire section arranged intermediate its length.

17. A vibratory mechanism for material spreaders comprising a walled hopper having apertures therein and a movable agitator in said hopper, a support attached to spaced walls of said hopper, a pendulum unit connected with said support and adapted for disposition within said hopper cavity and in a position for engagement by portions of said movable agitator, said pendulum unit comprising elongated flat leaf spring members connected with said support to flex in a predetermined direction in relation to said support, and material displacement elements connecting the free ends of said leaf spring members.

18. A vibratory mechanism for material spreaders including an apertured hopper and a movable agitator therein comprising a support for attachment with said hopper, a pendulum unit connected with said support and adapted for disposition within said hopper and in a position for engagement by portions of said agitator, said unit comprising elongated flat leaf springs members connected with said support to flex in a predetermined direction in relation to said support, and material displacement elements connecting the free ends of said leaf spring members, said leaf spring members each including apertures formed along the lengths thereof to permit penetration of hopper material during the flexing of said springs.

References Cited in the file of this patent

UNITED STATES PATENTS

| | | |
|---|---|---|
| 608,073 | Patterson | July 26, 1898 |
| 1,836,537 | Lawrence | Dec. 15, 1931 |
| 2,123,318 | Taylor | July 12, 1938 |
| 2,141,815 | Kelly | Dec. 27, 1938 |
| 2,533,386 | Masters | Dec. 12, 1950 |
| 2,710,117 | Fritz et al. | June 7, 1952 |

FOREIGN PATENTS

| | | |
|---|---|---|
| 275,749 | Switzerland | Sept. 1, 1951 |